(12) United States Patent
Ogrinz et al.

(10) Patent No.: US 11,354,325 B2
(45) Date of Patent: Jun. 7, 2022

(54) METHODS AND APPARATUS FOR A MULTI-GRAPH SEARCH AND MERGE ENGINE

(71) Applicant: Bank of America Corporation, Charlotte, NC (US)

(72) Inventors: Michael Ogrinz, Easton, CT (US); Heather Linn, Raleigh, NC (US)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 16/170,317

(22) Filed: Oct. 25, 2018

(65) Prior Publication Data

US 2020/0134076 A1 Apr. 30, 2020

(51) Int. Cl.
*G06F 16/248* (2019.01)
*G06F 16/901* (2019.01)
*G06F 7/14* (2006.01)
*G06F 21/55* (2013.01)

(52) U.S. Cl.
CPC .............. *G06F 16/248* (2019.01); *G06F 7/14* (2013.01); *G06F 16/9024* (2019.01); *G06F 21/552* (2013.01); *G06F 2221/034* (2013.01)

(58) Field of Classification Search
CPC ...... G06F 16/248; G06F 16/9024; G06F 7/14; G06F 21/552; G06F 2221/034
USPC ....................................................... 707/722
See application file for complete search history.

(56) References Cited

U.S. PATENT DOCUMENTS

| | | | |
|---|---|---|---|
| 6,906,709 B1 | 6/2005 | Larkin et al. | |
| 6,963,339 B2 | 11/2005 | Leah et al. | |
| 7,890,869 B1 | 2/2011 | Mayer et al. | |
| 8,099,787 B2 | 1/2012 | Vasudeva | |
| 8,803,884 B2 | 8/2014 | Bradshaw et al. | |
| 8,984,633 B2 | 3/2015 | Reutter | |
| 9,130,981 B2 | 9/2015 | Yi | |
| 9,609,011 B2 | 3/2017 | Muddu et al. | |
| 10,003,605 B2 | 6/2018 | Muddu et al. | |
| 10,547,493 B2 * | 1/2020 | Patnaikuni | G06Q 30/02 |
| 2010/0079462 A1 * | 4/2010 | Breeds | G06T 11/206 345/440 |
| 2013/0055302 A1 * | 2/2013 | De | H04N 21/252 725/25 |
| 2013/0191416 A1 * | 7/2013 | Lee | G06F 16/2457 707/771 |
| 2013/0246480 A1 * | 9/2013 | Lemcke | G06Q 10/10 707/797 |
| 2015/0295948 A1 | 10/2015 | Hassell et al. | |
| 2015/0347591 A1 * | 12/2015 | Bax | G06Q 30/0269 707/749 |
| 2016/0308898 A1 | 10/2016 | Teeple et al. | |
| 2017/0126727 A1 | 5/2017 | Beam et al. | |

(Continued)

*Primary Examiner* — Joshua Bullock
(74) *Attorney, Agent, or Firm* — Weiss & Arons LLP (57) ABSTRACT

Aspects of the disclosure relate to a system for amalgamating a plurality of graphs. The system may include a set of graphs. A user may input search criteria via a user interface ("UI") module. The system may search the set of graphs for a subset of qualifying graphs that satisfy the search criteria. The subset of graphs may be merged into an amalgamated graph. Merging the graphs may include superimposing the qualifying graphs over each other at a locus. The locus may be a node or a sub-graph. The amalgamated graph may be displayed via the UI module.

20 Claims, 7 Drawing Sheets

(56) References Cited

U.S. PATENT DOCUMENTS

| | | | |
|---|---|---|---|
| 2017/0126728 A1 | 5/2017 | Beam et al. | |
| 2017/0169230 A1 | 6/2017 | Zheng et al. | |
| 2017/0286422 A1* | 10/2017 | Bhowan | G06F 16/9024 |
| 2017/0289187 A1* | 10/2017 | Noel | G06F 16/28 |
| 2018/0034837 A1 | 2/2018 | Lakhani et al. | |
| 2018/0069885 A1* | 3/2018 | Patterson | G06F 16/27 |
| 2018/0103052 A1* | 4/2018 | Choudhury | G06F 16/9024 |
| 2018/0159876 A1* | 6/2018 | Park | G06F 16/9024 |
| 2018/0159881 A1* | 6/2018 | Crabtree | H04L 63/1433 |
| 2018/0349002 A1* | 12/2018 | Kindelsberger | G06F 3/0484 |
| 2018/0367549 A1* | 12/2018 | Jang | G06F 16/9024 |
| 2020/0110827 A1* | 4/2020 | Freedman | G06F 16/24542 |

* cited by examiner

//  METHODS AND APPARATUS FOR A MULTI-GRAPH SEARCH AND MERGE ENGINE

FIELD OF TECHNOLOGY

Aspects of the disclosure relate to computer systems. Specifically, aspects of the disclosure relate to computer systems for displaying and/or manipulating graphs.

BACKGROUND OF THE DISCLOSURE

A graph may be collection of points arranged in a particular meaningful way. One type of graph may include a diagram with nodes that are connected by edges. The nodes often represent certain elements, such as objects, events, or concepts. The edges typically represent relationships between the elements of the nodes they connect.

Graphs may be used to construct visual representations of real-world or simulated chains of events. The nodes may be individual events. The edges connecting the nodes may represent spatial, temporal, or causal relationships between the events.

The ability to search a set of many graphs for common elements and/or patterns would increase the value of the data provided by the graphs. It would be even more valuable if the graphs with common elements and/or patterns could be amalgamated into a single, merged, graph. The single, merged, graph would be a powerful analytical tool combining the data of many related graphs into one.

It would be desirable, therefore, to provide a system for displaying multiple graphs. It would be further desirable for the system to be searchable. It would be still further desirable for the system to amalgamate multiple related graphs into a single, merged, graph for display.

SUMMARY OF THE DISCLOSURE

Aspects of the disclosure relate to a multi-graph search and merge engine. The engine may include a set of one or more graphs. At least one graph from the set of graphs may include two or more nodes. The two or more nodes may be interconnected by one or more edges.

The engine may also include a set of computer executable code. When run on a processor, the computer executable code may be configured to receive a search criterion. The search criterion may be received as input via a user interface ("UP") module. The search criterion may include a node profile or a subgraph profile.

The engine may search the set of graphs for a subset of graphs that each satisfy the search criterion. A graph may satisfy the search criterion by containing a node or subgraph that matches the node profile or subgraph profile of the search criterion.

The engine may also merge all of the graphs from the subset of graphs into a merged graph. The merging may include superimposing the graphs from the subset of graphs onto each other. The superimposing may be aligned at the matching nodes or subgraphs. The engine may display the merged graph via the UI module.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to a multi-graph search and merge engine. The engine may be a computer platform. The platform may include a set of one or more graphs. At least one graph from the set of graphs may include two or more nodes. The two or more nodes may be interconnected by one or more edges. The nodes may be connected in a parent-child relationship—each parent node connecting to at least one child node.

In one example, the set of graphs may include attack graphs. An attack graph may represent a collection of security incidents that are interconnected. The security incidents may relate to cybersecurity. The attack graph may provide a high-level map of a chain of incidents that may culminate in an exploit. An exploit may be an attack on a computer system, and may be known as a hack or a compromise. Analyzing the graph may be valuable for gaining insight into that exploit, as well developing a library of patterns that may be useful for discovering or preventing other exploits.

The platform may also include a set of computer executable code. When run on a processor, the computer executable code may be configured to receive a search criterion. The search criterion may be received as input via a user interface ("UP") module. The search criterion may include a node profile or a subgraph profile.

The platform may search the set of graphs for a subset of graphs that each satisfy the search criterion. The subset may be stored as an actual data structure. The data structure may be part of, or separate from, a data structure storing the set of graphs. Alternatively, the subset may be a virtual, or conceptual, subset of the graphs that satisfy the search criterion. A graph may satisfy the search criterion by containing a node or subgraph that matches the node profile or subgraph profile of the search criterion.

The platform may also merge all of the graphs from the subset of graphs into a merged graph. The merging may include superimposing the graphs from the subset of graphs onto each other. The superimposing may be aligned at the matching nodes or subgraphs. The platform may display the merged graph via the UI module.

In some embodiments of the platform, each graph from the set of graphs may define a beginning and an end. For example, the left-most node may be the beginning of the graph. The right-most node may be the end of the graph. Beginning and end may correspond to a chronological, causational, enablement, or any other suitable relationship.

In some instances, more than one node or subgraph in a particular graph may match the search criterion. In these instances, the matching node or subgraph that is closest to the beginning of the particular graph may be selected as the matching node or subgraph at which the particular graph is superimposed on the other graphs in the subset of graphs. In other embodiments, the platform may select the last, middle, or any other suitable matching element.

In certain embodiments of the platform, merging the subset of graphs may further include coloring each graph of the subset of graphs a distinct color selected from a set of colors. This way, the merged graph may present a single unified picture that amalgamates the data of all the original graphs, while retaining the distinct identities of those original graphs.

Merging the subset of graphs may, in some embodiments, include arraying the graphs in the subset in close proximity one to another. Merging graphs in this fashion may strongly retain the distinct identities of the original graphs, while still combining the data in a useful way.

In certain embodiments, abridged versions of the graphs in the subset may be merged. For example, only a certain number of "generations" (e.g., 2, 3, 4, 5, or any other suitable number of node layers) of either side of the matching node may be amalgamated into the merged graph. In another example, only the node-path that leads to an exploit may be included in the merged graph. Branches of the graphs that do not include significant incidents may, in some embodiments, be excluded (or hidden, with an option to include them) from the merged graph. In other embodiments, the complete graphs from the subset are included in the merged graph.

In some embodiments, each node of each graph in the set of graphs may represent an event. The event may be defined by a predetermined set of properties. Properties may include an event description. The event description may be selected from a predetermined set of event descriptions. Properties may also include time, location, or any other suitable descriptive event property.

In certain embodiments, each edge of each graph in the set of graphs may connect a first node to a second node. The connection may define a causational relationship between the first and second nodes. A causational relationship may include a scenario where the event of the first node causes the event of the second node. One event causing another may include a direct causation. One event causing another may also include an indirect causation—i.e., where the first event enabled, allowed, led to, or is otherwise related to the occurrence of the second event.

In some exemplary embodiments of the platform, each event may define a cybersecurity incident. A cybersecurity incident may include an event that may be associated with a cybersecurity exploit. More specifically, a cybersecurity incident may lead to, or be a part of, a cybersecurity exploit. For example, a remote login from a private machine to a network may be an event classified as a cybersecurity incident. Although usually innocuous, in some circumstances, a remote login may be an entry point for a malicious actor to gain illicit entry into the network.

Other examples of cybersecurity incidents may include compromise of a firewall or any other defense barrier or mechanism. Another example may include defense evasion. Still other examples may include credential access, privilege escalation, discovery, lateral movement, and information and/or property theft. Some or all of the aforementioned may, in sequence, be an example of a causational chain of cybersecurity incidents.

In some embodiments, the nodes of the graphs in the platform may adhere to a predetermined standard format. One example may be the ATT&CK™ framework produced by MITRE Corporation. The ATT&CK™ framework may provide a standardized set of cybersecurity incident properties. The properties may define certain tactics, techniques, and/or procedures ("TTPs") employed by malicious actors. Each node in the platform may represent one incident, as defined by the ATT&CK™ properties.

Embodiments of the platform may be further configured for cybersecurity analysis. The platform may be configured to analyze past cybersecurity incidents. The platform may also be configured to predict potential future cybersecurity threats.

For example, a security analyst may use the platform as a tool to explore the causes and effects of certain events. The platform may show, after searching and merging the graphs around event A, that event B is likely to follow. Thus, it may be established that if event A occurs, event B may be statistically likely to follow. This may be useful in assessing the downstream impact of an incident that compromises the security of a system. This may also be useful in forecasting—and possibly preempting—threats, particularly where event B represents an exploit. In some embodiments, an occurrence of event A may trigger an alert.

The platform may also show, after searching and merging the graphs around event Y, that event X is likely to precede event Y. Thus, it may be established that if event Y occurs, event X may be statistically likely to have preceded it. This may be useful in discovering previous threats, particularly where event X represents an exploit. In some embodiments, an occurrence of event Y may trigger an alert.

The exemplary analyses of the previous paragraphs may also apply to subgraphs. A subgraph—a specific arrangement of nodes and edges—may represent an intrusion set, or a group of interconnected events. Searching and merging the set of graphs on a specific subgraph may be useful for statistical (or other) analysis in forecasting events and discovering previous events based on the occurrence of an intrusion set.

In some embodiments, the platform may be configured to autonomously perform threat (or any other type of event) detection and analysis. The platform may include a set of rules for controlling search parameters and criteria. The rules may also control the platform to detect threatening or suspicious patterns in merged graphs.

For example, the platform may use a brute force method and search the set of graphs for each possible type of node in a set of nodes. The search results may be processed for detecting certain patterns. The search results for a node may be flagged when threatening events occur in more than a threshold percentage of graphs containing the node. The platform may also leverage artificial intelligence ("AI") or machine learning ("ML") techniques in the detection and analysis.

The exemplary cybersecurity applications of the platform are for illustrative purposes only. Other exemplary applications may include security vulnerability, detection pathways, and threat management and/or modeling. Still other applications may include various business process and/or modeling applications. The platform may be useful for many other suitable real-world applications.

The platform may, in certain embodiments, include a pivot feature. A pivot feature may provide the ability to pivot from one graphical representation mode, to one or more other—and possibly related—modes. For example, in a first mode, the platform may show a graph whose nodes represent cybersecurity incidents. A pivot may direct the platform to replace (or, in some embodiments, supplement) the first mode with a second mode. The second mode may show a graph whose nodes represent indicators that correspond to the incidents of the first mode. An indicator may be an observable element associated with an incident. A third mode may show a graph with nodes that represent sources and/or sensors. Information derived from the sources and/or sensors may be associated with, or contribute to, the indicators. The platform may include any suitable number of modes.

The platform may be toggle-able between the modes. In some embodiments, the platform may be configured to display multiple modes concurrently. Concurrent display may be side-by-side, superimposed, or any other suitable way of displaying multiple modes.

In some embodiments of the platform, the set of graphs may be stored in a hybrid database. Conventionally, data may be stored either in a graph database or in a relational database. The hybrid database, by contrast, may utilize both graph and relational databases in tandem. The hybrid architecture may provide increased performance and efficiency when running queries, maintaining version control, and storing meta and reference data.

In some embodiments, a dynamic platform for multigraph searching and merging is provided. The platform may include a set of one or more graphs. At least one graph from the set of graphs may include two or more nodes interconnected by one or more edges.

The platform may also include a set of computer executable code. When run on a processor, the code may be configured to receive, as input, a search criterion. The search criterion may be received via a user interface ("UI") module. The UI module may be configured to receive input and display output. For example, the UI module may include a keyboard, screen (touch-enabled or otherwise), microphone, mouse and/or any other input/output component.

The platform may search the set of graphs for a subset of graphs that each satisfy the search criterion. In an exemplary scenario, the set of graphs may contain 1000 graphs. The search criterion may define a particular type of node. The platform may search the set of graphs and find that 25 graphs (of the 1000) contain the type of node defined by the search criterion. Those 25 graphs may then comprise the subset.

The platform may merge all of the graphs from the subset of graphs into a merged graph. The platform may also display the merged graph as displayed output. For example, the merged graph may be displayed on a screen of the UI module.

In some embodiments of the platform, the search criterion may include a node profile. A node profile may include a set of one or more node properties. The platform may include a predetermined set of distinct node profiles.

In certain embodiments, the subset of graphs may include all of the graphs from the set of graphs that include at least one matching node. A matching node may be a node that matches the node profile. Merging the subset of graphs may include the steps of: selecting a matching node from a first graph in the subset of graphs as a locus node; selecting a matching node from each of the remaining graphs as secondary nodes; and superimposing the remaining graphs onto the first graph. Superimposing the graphs may include superimposing the secondary nodes onto the locus node, thus "pinning" the graphs together at each graph's respective matching node to form a single merged graph.

In some embodiments, each graph from the set of graphs may define a beginning and an end. The first—i.e., closest to the beginning—matching node in the first graph may be selected as the locus node. The first matching node in each of the remaining graphs may be selected as the secondary nodes. In other embodiments, any other suitable rule for selecting a matching element may be employed.

In certain embodiments, the search criterion may also include a subgraph profile. A subgraph profile may include a set of nodes. Each node from the set of nodes may include a set of node properties. The nodes from the set of nodes may be connected in a particular arrangement via a set of edges. The search and merge processes proceed similar to the processes described above. The difference may include substituting a subgraph profile in place of a node profile.

In some embodiments of the platform, merging the subset of graphs may also include coloring each graph of the subset of graphs a distinct color. The colors may be selected from a predetermined set of colors.

In certain embodiments of the platform, each node of each graph in the set of graphs may represent an event. An event may be defined by a predetermined set of properties.

In some embodiments, each edge of each graph in the set of graphs may connect a first node to a second node. The connection may define a causational relationship between the first and second nodes, wherein the event of the first node causes the event of the second node.

In certain embodiments of the platform, each event may define a cybersecurity incident. The platform may be configured to analyze past cybersecurity incidents. The platform may also be configured to predict potential future cybersecurity incidents.

In some embodiments, the platform may include a plurality of modes. Each node of each graph in the platform—in some embodiments this may include the merged graphs—may be associated with a plurality of values. Each value may correspond to one of the plurality of modes. The platform, when in a selected mode, may be configured to display the values corresponding to the selected mode. In some embodiments, the values may be shown on, near, or otherwise associated with, their associated nodes.

The modes may be linked to each other. The values of one mode may be informative to, or otherwise related to, the values of another mode. The platform may be configured to pivot from one mode to another.

In some embodiments of the platform, the set of graphs may be stored in a hybrid database. A hybrid database may include more than one database type, such as a graph database and a relational database.

In certain embodiments, a method for amalgamating a plurality of graphs is provided. The method may include searching, via a processor, a set of graphs. The search may be for all the graphs that satisfy a search criterion. The search criterion may include a set of properties that is received as input.

The methods may include forming a qualifying subset. The qualifying subset may include the graphs that satisfy the search criterion. The method may also include amalgamating, via the processor, the graphs in the qualifying subset into a merged graph. The method may also include displaying the merged graph on a display.

In some embodiments, the set of properties of the search criterion may define either a node profile or a subgraph profile. A graph that satisfies the search criterion may include a unifying node or a unifying subgraph. The unifying node or unifying subgraph may be a node or subgraph that matches the search criterion. Amalgamating the graphs may include superimposing the subset of graphs on each other at the unifying nodes or unifying subgraphs.

In certain embodiments of the methods, when more than one node or subgraph in a particular graph matches the search criterion, the matching node or subgraph that is closest to the beginning of the particular graph may be selected as the unifying node or subgraph.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIGS. 1-5 may show part of a search and merge process of an exemplary instance of a multi-graph search and merge platform. The example shown in FIGS. 1-5 may show a search on a node profile.

Figure 1:
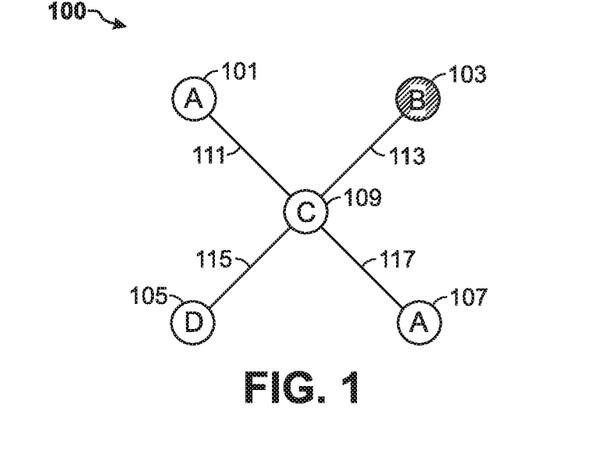
FIG. 1 shows an illustrative diagram in accordance with principles of the disclosure.

FIG. 1 shows an exemplary diagram in accordance with principles of the disclosure. The diagram may represent a graph 100. Graph 100 may be an exemplary graph in the set of graphs in an instance of a multi-graph search and merge platform. The diagram of graph 100 may be a conceptual diagram of the nodes and edges contained in the graph. In some embodiments, the diagram of graph 100 may appear similarly to the way a graph is displayed on a screen of the platform.

Graph 100 may include nodes 101-109. The nodes may be interconnected by edges 111-117. An edge connecting two nodes may show a relationship between the two nodes.

Nodes 101 and 107 may be of type A. Node 103 may be of type B. Node 105 may be of type D, and node 109 may be of type C. Node types may correspond to specific node profiles. A node profile may be a collection of node properties and/or parameters.

A search criterion may have been received for a node profile of type B. The shading of node 103 depicts that node 103 matches the node profile. Therefore, graph 100 may satisfy the search criterion.

Figure 2:
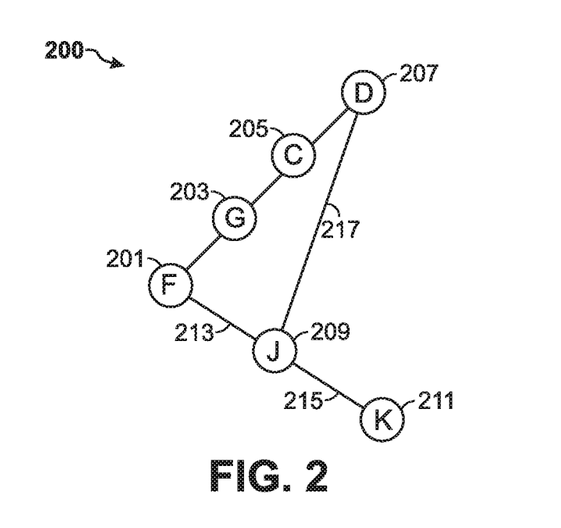
FIG. 2 shows another illustrative diagram in accordance with principles of the disclosure.

FIG. 2 shows an exemplary diagram in accordance with principles of the disclosure. The diagram may represent a graph 200. Graph 200 may be another exemplary graph in the set of graphs. The diagram of graph 200 may be a conceptual diagram of the nodes and edges contained in the graph. In some embodiments, the diagram of graph 200 may appear similarly to the way a graph is displayed on a screen of the platform.

Graph 200 may include nodes 201-211. The nodes may be interconnected by edges 213-217. An edge connecting two nodes may show a relationship between the two nodes.

Node 201 may be of type F. Node 203 may be of type G. Node 205 may be of type C. Node 207 may be of type D. Node 209 may be of type J. Node 211 may be of type K.

A search criterion may have been received for a node profile of type B. None of the nodes in graph 200 match the node profile. Therefore, graph 200 may not satisfy the search criterion.

Figure 3:
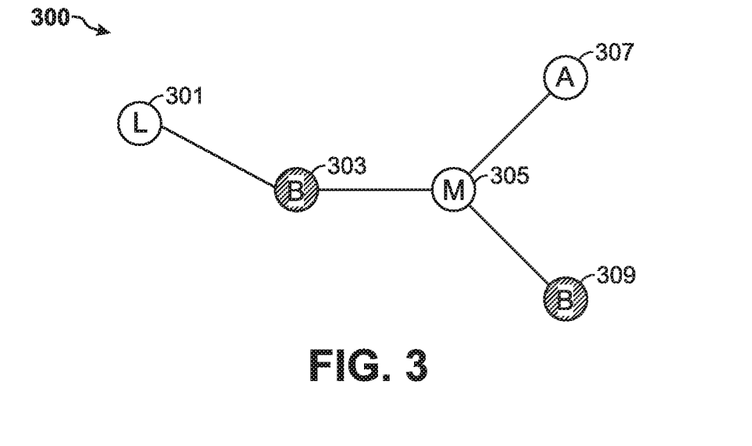
FIG. 3 shows yet another illustrative diagram in accordance with principles of the disclosure.

FIG. 3 shows an exemplary diagram in accordance with principles of the disclosure. The diagram may represent a graph 300. Graph 300 may be another exemplary graph in the set of graphs. The diagram of graph 300 may be a conceptual diagram of the nodes and edges contained in the graph. In some embodiments, the diagram of graph 300 may appear similarly to the way a graph is displayed on a screen of the platform.

Graph 300 may include nodes 301-309. Node 301 may be of type L. Nodes 303 and 309 may be of type B. Node 305 may be of type M. Node 307 may be of type A. Various edges may interconnect nodes 301-309 of graph 300.

A search criterion may have been received for a node profile of type B. The shading of nodes 303 and 309 depicts that they both match the node profile. Therefore, graph 300 may satisfy the search criterion.

Figure 4:
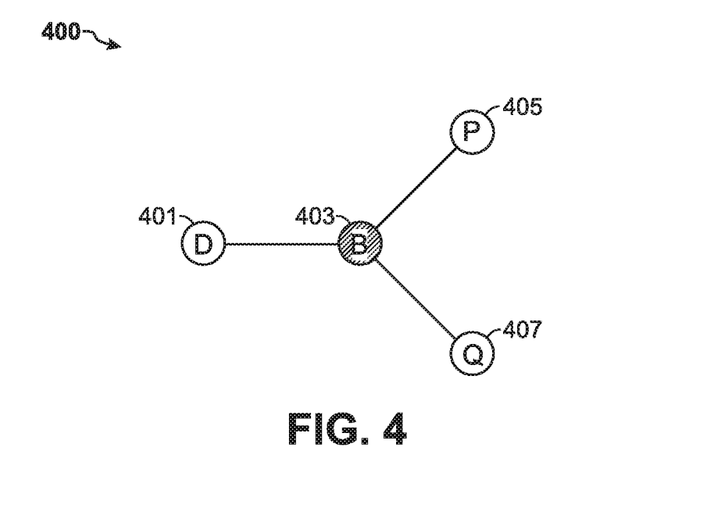
FIG. 4 shows still another illustrative diagram in accordance with principles of the disclosure.

FIG. 4 shows an exemplary diagram in accordance with principles of the disclosure. The diagram may represent a graph 400. Graph 400 may be another exemplary graph in the set of graphs. The diagram of graph 400 may be a conceptual diagram of the nodes and edges contained in the graph. In some embodiments, the diagram of graph 400 may appear similarly to the way a graph is displayed on a screen of the platform.

Graph 400 may include nodes 401-407. Node 401 may be of type D. Node 403 may be of type B. Node 405 may be of type P. Node 407 may be of type Q. Various edges may interconnect nodes 401-407 of graph 400.

A search criterion may have been received for a node profile of type B. The shading of node 403 depicts that it matches the node profile. Therefore, graph 400 may satisfy the search criterion.

Figure 5:
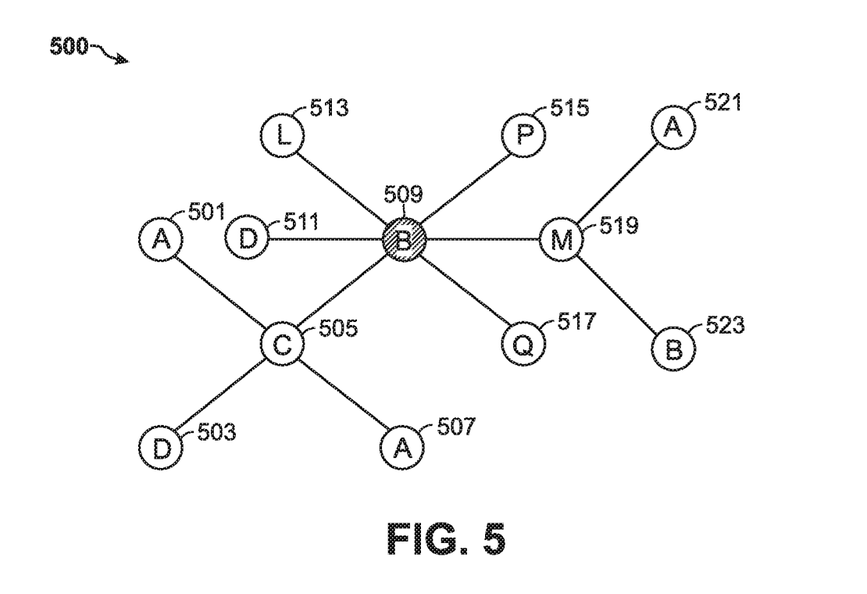
FIG. 5 shows another illustrative diagram in accordance with principles of the disclosure.

FIG. 5 shows an exemplary diagram in accordance with principles of the disclosure. The diagram may represent a graph 500. Graph 500 may be a merged, or amalgamated, graph. The platform may produce merged graph 500 as a result of a search for a node of type B on a set of graphs that includes graphs 100-400 (FIGS. 1-4).

Graph 500 may be produced by superimposing graphs 100, 300, and 400—the graphs that satisfied the search criterion by containing at least one node of type B—on each other. Graphs 100, 300, and 400 are amalgamated by merging nodes 103 (from graph 100 of FIG. 1), 303 (from graph 300 of FIG. 3), and 403 (from graph 400 of FIG. 4) into a single locus node 509. The rest of graphs 100, 300, and 400 may be arranged accordingly around the locus node 509.

In this embodiment, node 303 is selected for merging as opposed to node 309, which also matches the node profile, because node 303 is the first matching node in graph 300.

The result of the amalgamation is a single, unified graph 500 with nodes 501-523. Nodes 501-523 are interconnected by various edges, mirroring the arrangements of the original subset of graphs 100, 300, and 400, on which graph 500 is based.

The exemplary search and merge process illustrated in FIGS. 1-5 may, in some embodiments, utilize computer executable code, such as the exemplary code shown in Table A. The code contains comments for illustrative and explanatory purposes.

TABLE A

```
{
    String newJson="";
    // allNodes and allEdges are data structures that will contain the structure of the
    // search output. mergeLegend will contain data related to the color and names of
    // the graphs combined to produce the final output
    ArrayList<Node> allNodes = new ArrayList<Node>( );
    ArrayList<Edge> allEdges = new ArrayList<Edge>( );
    ArrayList<Legend> mergeLegend = new ArrayList<Legend>( );
    Gson gson = new Gson( );
    boolean found = false;
    String locusId = "", searchText="", oldId="";
    Connection connection = null;
    Graph gOutput = new Graph( );
    gOutput.setOperation("search");
    // searchText is the collection of node properties to search on. In this
    // implementation, the parameters are stored as a delimited string
    searchText = req.getParameter("q");
    try {
        connection = DBUtility.getConnection( );
        // Graphs are stored in both relational and graph databases. For this type of
        // search, either repository can be used. The first step is to find the unique Id of
        // each graph which has *at least* 1 node that matches the selected search
        // properties
        PreparedStatement pstmt = connection.prepareStatement("select
id,graph_json,title=isNull(title,'') from graphs where graph_json like
'%text[|]mK:[|]mK"+searchText+"[|]mK%'");
        ResultSet rs = pstmt.executeQuery( );
        int rowCount = 0;
        int paletteIndex=0;
        while (rs.next( )) {
// All the returned graphs contain at least 1 node that meets the search criteria.
// These graphs need to be merged together into a single graph that can be displayed.
// Combine all these graphs on a single node that meets the search criteria.
// Call this the "locus node". Keep in mind a graph may contain more than 1 node
// that meets the search criteria. The "locus node" for that graph will (in this embodiment)
// be the first node encountered that meets the search criteria
// keep track of what # graph in the search results is being processed
            rowCount++;
            // retrieve the structure of the graph in JSON format
            String graph = rs.getString("graph_json");
            // retrieve the unique identifier of the graph
            int graphId = rs.getInt("id");
            // create a graph object from the retrieved JSON. This will allow
            // easier traversal of the internal data structures of the graph (nodes,
            // edges, etc)
            Graph g = null;
            try {
                g = gson.fromJson(graph, Graph.class);
            } catch(Exception e) {
                System.err.println(e.getMessage( ));
            }
            // Determine the number of nodes and edges in the graph
            int nLen=g.getNodes0.1ength;
            int eLen=g.getEdges0.1ength;
            // Each graph in the search results gets a distinct color-code. Create a
            // legend object to include in the search results. The graph color is
            // assigned from a predetermined list of colors.
            Legend ll = new Legend( );
            ll.setId(graphId);
            ll.setColor(colorPalette[paletteIndex]);
            ll.setTitle(rs.getString("title"));
            mergeLegend.add(ll);
            if (rowCount==1) {
                // Step 1:
                // The very first graph processed (rowCount==1) is the
                // graph used to merge all the other results into.
                // Therefore, this graph must be walked until the first
                // node that matches the search parameters is found.
                // This will become the "Locus node"
                // Examine each node in the graph
                for (int i=0;i<nLen;i++) {
                    Node n = g.getNodes( )[i];
                    // Set each node to the color to be used for
                    // this graph from the legend constructed above
                    n.getAttributes( ).setColor(colorPalette[paletteIndex]);
                    // If the node matches the search parameters, set a
                    // special "highlight" color for the node. Record the
                    // Id of this node for future reference. Set the
                    // "found" flag to ignore any other nodes
```

TABLE A-continued

```
                       // that meet the search parameters
                       if (searchText.equals(n.getAttributes( ).getText( ))
&& !found) {
                              found=true;
                              locusId=n.getId( );
                              n.getAttributes( ).setColor(highlightNodeColor);
                       }
               }
               // Process the edges of the graph and set their color to
               // match what was selected for the graph legend
               for (int i=0;i<eLen;i++) {
                       Edge e = g.getEdges( )[i];
                       e.getAttributes( ).setColor(colorPalette[paletteIndex]);
               }
               // Now that the graph has been scanned and re-colored, add
               // it to the data structures that contain the final search output
               allNodes.addAll(Arrays.asList(g.getNodes( )));
               allEdges.addAll(Arrays.asList(g.getEdges( )));
       } else {
// Step 2:
// When rowCount>1, the first graph has been processed and the locus node has been
// identified. Now, the remaining graphs must be updated to link them around the locus
// node. If a graph contains multiple nodes that match the search parameters, only use the
// first node encountered when walking the graph data structure
               for (int i=0;i<nLen;i++) {
                       // Color each node to match what is indicated in the legend
                       Node n = g.getNodes( )[i];
                       n.getAttributes( ).setColor(colorPalette[paletteIndex]);
                       // If a node matches the search criteria, flag it for being
                       // removed from the final results. Later, adjust any
                       // edges that point to (or originate from) this node to instead
                       // use the id of the Locus Node identified in Step 1
                       if (searchText.equals(n.getAttributes( ).getText( ))) {
                           oldId = n.getId( );
                           n.setId("REMOVE");
                           n.getAttributes( ).setText("Remove Node");
                       } else {
                       // When combining graphs, it is possible that the
                       // underlying identifier used for a particular node may
                       // already exist. This may create problems when rendering
                       // or storing the graph. For this reason, the Id of each node
                       // added to the results can be artificially mangled to avoid
                       // potential collisions
                              n.setId(rowCount+"-"+n.getId( ));
                       }
               }
               // Add all nodes to the output structure. Note that the edges
               // connecting the nodes are not added (as we did in Step 1). This is
               // because edges need to be updated after removing the appropriate
               // node from graphs 2+ in the search results (see below)
               allNodes.addAll(Arrays.asList(g.getNodes( )));
// Update all edges
// When merging 2 graphs together on a particular node, one node stays (from
// graph 1) and 1 node is removed (from graph 2). To combine the data
// structures, it may be desired to delete the node from graph 2, and change any edges
// that point to (or originated from) this node to instead reference the node
// Id references in graph 1. In this case, the "surviving node Id" is the
// locus id identified in Step 1 above
               for (int i=0;i<eLen;i++) {
                       Edge e = g.getEdges( )[i];
                       e.getAttributes( ).setColor(colorPalette[paletteIndex]);
                       e.setId(rowCount+"-"+e.getId( ));
                       if (e.getSource( ).equals(oldId) &&
!e.getTarget( ).equals(oldId)) {
                              e.setSource(locusId);
                              e.setTarget(rowCount+"-"+e.getTarget( ));
                       } else if (e.getTarget( ).equals(oldId) &&
!e.getSource( ).equals(oldId)){
                              e.setTarget(locusId);
                              e.setSource(rowCount+"-"+e.getSource( ));
                       } else if (e.getTarget( ).equals(oldId) &&
e.getSource( ).equals(oldId)) {
                              e.setTarget(locusId);
                              e.setSource(locusId);
                       } else {
                              e.setSource(rowCount+"-"+e.getSource( ));
                              e.setTarget(rowCount+"-"+e.getTarget( ));
                       }
               }
               // Now that the edges have been updated, they can be added to the
```

TABLE A-continued

```
            // output data structure
            allEdges.addAll(Arrays.asList(g.getEdges( )));
        }
// Choose a difference color for the next graph being processed. Once the length
// of the predefined list of colors is exceeded, go back to the beginning of the list
        paletteIndex++;
        if (paletteIndex>=colorPalette.length) {
                paletteIndex=0;
            }
        }
    }
// Step 3: Remove duplicate "locus/overlap" nodes
// Delete any existing nodes on graphs 2+ that match the search criteria, but have
// already had their edges re-pointing to the locus node
        Iterator<Node> it = allNodes.iterator( );
        while (it.hasNext( )) {
          if ("REMOVE".equals(it.next( ).getId( ))) {
            it.remove( );
          }
        }
    }
// Step 4:
// Convert the internal data structures back to JSON and return to the application's
// front-end to provide a visual rendering
        Node[] n = allNodes.toArray(new Node[allNodes.size( )]);
        Edge[] e = allEdges.toArray(new Edge[allEdges.size( )]);
        Legend[] l = mergeLegend.toArray(new Legend[mergeLegend.size( )]);
        gOutput.setNodes(n);
        gOutput.setEdges(e);
        gOutput.setLegend(l);
        gOutput.setResultCode(rowCount);
        gOutput.setResultValue(locusId);
        newJson = gson.toJson(gOutput);
    }
    catch (SQLException sqle){
        System.err.println(sqle.getMessage( ));
        sqle.printStackTrace( );
    }
    finally{
        try {connection.close( );} catch (SQLException sqle) { }
    }
    PrintWriter out = res.getWriter( );
    out.println(newJson);
    out.flush( );
}
```

FIGS. 6-9 may show part of a search and merge process of an exemplary instance of a multi-graph search and merge platform. The example shown in FIGS. 6-9 may show a search on a subgraph profile.

Figure 6:
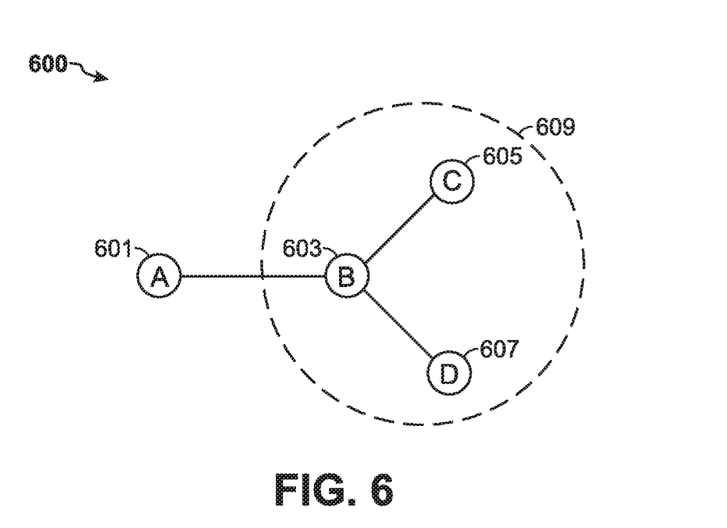
FIG. 6 shows yet another illustrative diagram in accordance with principles of the disclosure.

FIG. 6 shows an exemplary diagram in accordance with principles of the disclosure. The diagram may represent a graph 600. Graph 600 may be an exemplary graph in the set of graphs in an instance of a multi-graph search and merge platform. The diagram of graph 600 may be a conceptual diagram of the nodes and edges contained in the graph. In some embodiments, the diagram of graph 600 may appear similarly to the way a graph is displayed on a screen of the platform.

Graph 600 may include nodes 601-607. Various edges may interconnect nodes 601-607 of graph 600. An edge connecting two nodes may show a relationship between the two nodes.

Node 601 may be of type A. Node 603 may be of type B. Node 605 may be of type C, and node 607 may be of type D. Node types may correspond to specific node profiles. A node profile may be a collection of node properties and/or parameters.

A search criterion may have been received for a subgraph profile. The subgraph profile may be match the subgraph contained in circle 609. Circle 609 may include a node of type B on the left (node 603) that is connected by a first edge to a node of type C on the right (node 605) and also connected by a second edge to a node of type D on the right (node 607). Graph 600, which contains the subgraph profile in circle 609, may satisfy the search criterion.

Figure 7:
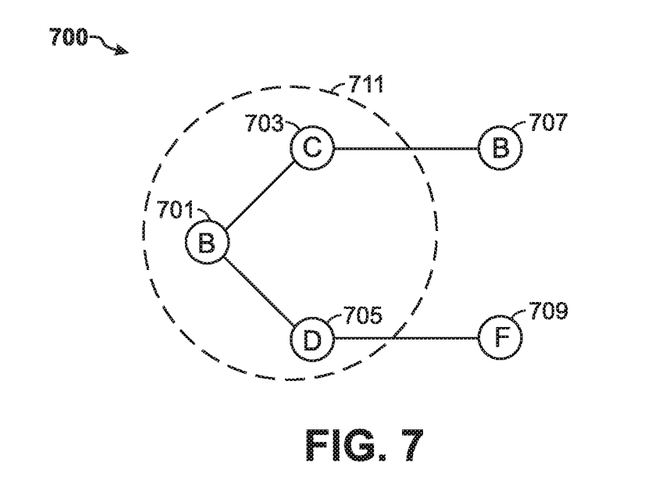
FIG. 7 shows still another illustrative diagram in accordance with principles of the disclosure.

FIG. 7 shows an exemplary diagram in accordance with principles of the disclosure. The diagram may represent a graph 700. Graph 700 may be an exemplary graph in the set of graphs in an instance of a multi-graph search and merge platform. The diagram of graph 700 may be a conceptual diagram of the nodes and edges contained in the graph. In some embodiments, the diagram of graph 700 may appear similarly to the way a graph is displayed on a screen of the platform.

Graph 700 may include nodes 701-709. Various edges may interconnect nodes 701-709 of graph 700. An edge connecting two nodes may show a relationship between the two nodes.

Node 701 may be of type B. Node 703 may be of type C. Node 705 may be of type D, and node 707 may be of type B. Graph 700, which contains the subgraph profile in circle 711, may also satisfy the search criterion.

Figure 8:
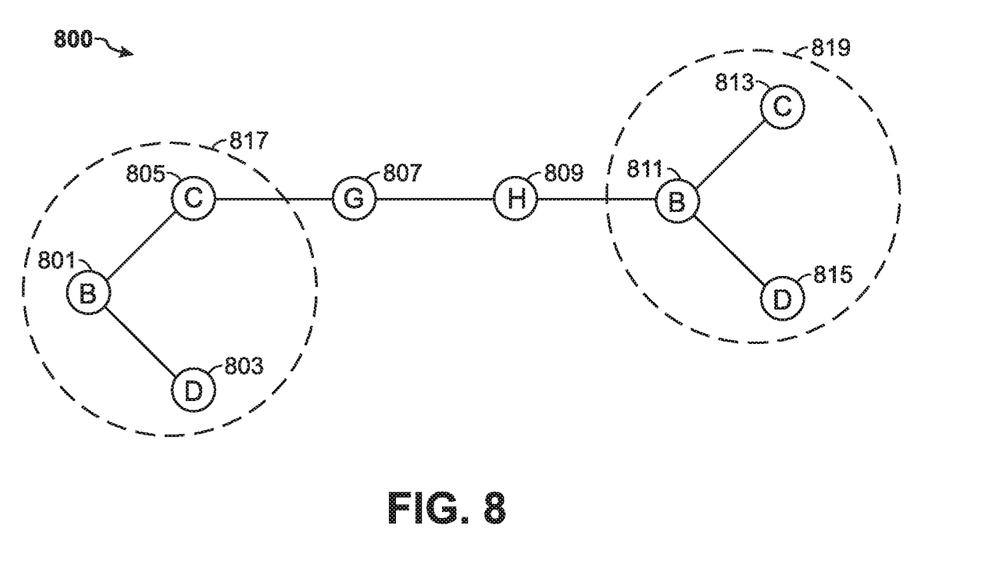
FIG. 8 shows another illustrative diagram in accordance with principles of the disclosure.

FIG. 8 shows an exemplary diagram in accordance with principles of the disclosure. The diagram may represent a graph 800. Graph 800 may be an exemplary graph in the set of graphs in an instance of a multi-graph search and merge platform. The diagram of graph 800 may be a conceptual diagram of the nodes and edges contained in the graph. In some embodiments, the diagram of graph 800 may appear similarly to the way a graph is displayed on a screen of the platform.

Graph 800 may include nodes 801-815. Various edges may interconnect nodes 801-815 of graph 800. An edge connecting two nodes may show a relationship between the two nodes.

Node 801 may be of type B. Node 803 may be of type D. Node 805 may be of type C, and node 807 may be of type G. Node 809 may be of type H. Node 811 may be of type B. Node 813 may be of type C, and node 815 may be of type D.

Graph 800, which contains the subgraph profile in both circles 817 and 819, may also satisfy the search criterion.

Figure 9:
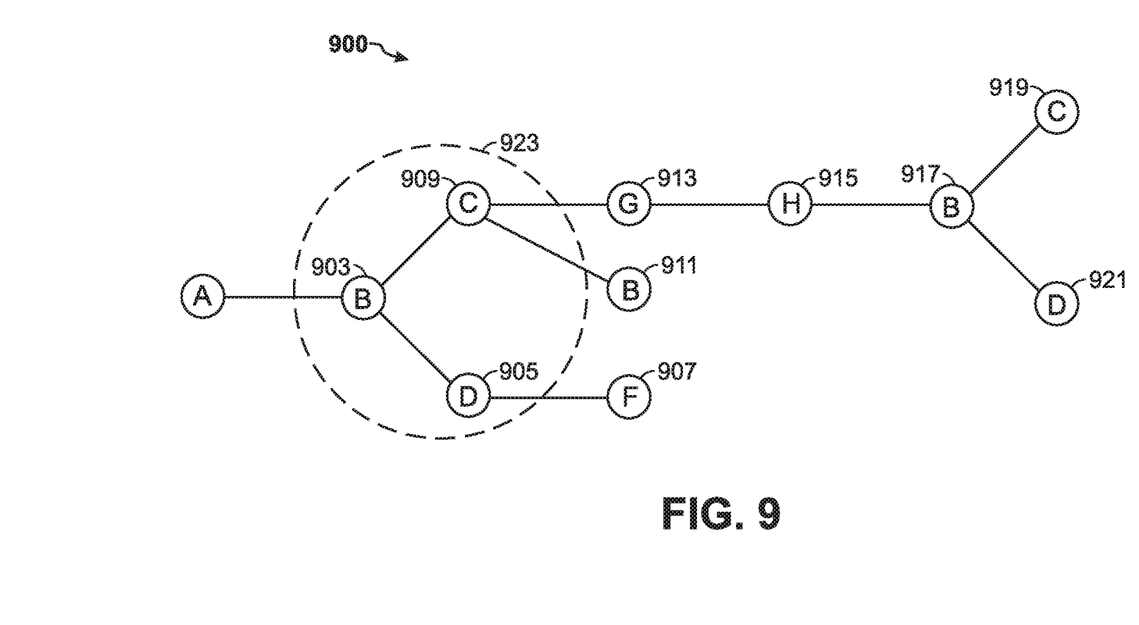
FIG. 9 shows yet another illustrative diagram in accordance with principles of the disclosure.

FIG. 9 shows an exemplary diagram in accordance with principles of the disclosure. The diagram may represent a graph 900. Graph 900 may be a merged, or amalgamated, graph. The platform may produce merged graph 900 as a result of a search for a particular subgraph profile on a set of graphs that includes graphs 600-800 (FIGS. 6-8).

Graph 900 may be produced by superimposing graphs 600, 700, and 800—all three graphs satisfied the search criterion—on each other. Graphs 600, 700, and 800 may be amalgamated by merging the subgraphs from circle 609 (from graph 600 of FIG. 6), 711 (from graph 700 of FIG. 7), and 817 (from graph 800 of FIG. 8) into a single locus subgraph in circle 923. The rest of graphs 600, 700, and 800 may be arranged accordingly around the subgraph in circle 923.

In this embodiment, the subgraph in circle 817 is selected for merging as opposed to the subgraph in circle 819, which also matches the subgraph profile, because the subgraph in circle 817 is the first matching subgraph in graph 800.

The result of the amalgamation is a single, unified graph 900 with nodes 901-921. Nodes 901-921 are interconnected by various edges, mirroring the arrangements of the original subset of graphs 600, 700, and 800, on which graph 900 is based.

Figure 10:
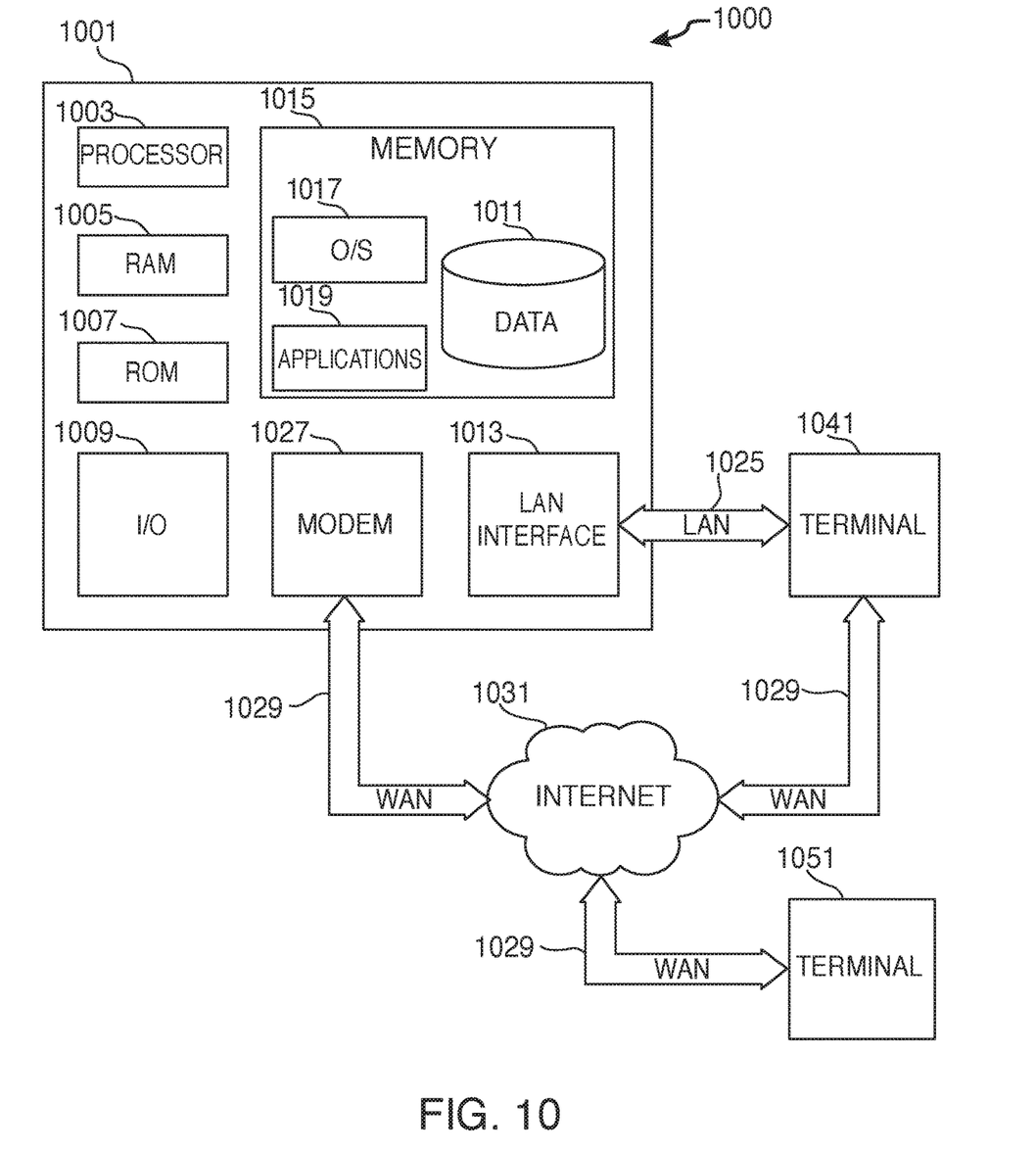
FIG. 10 shows still another illustrative diagram in accordance with principles of the disclosure.
Figure 11:
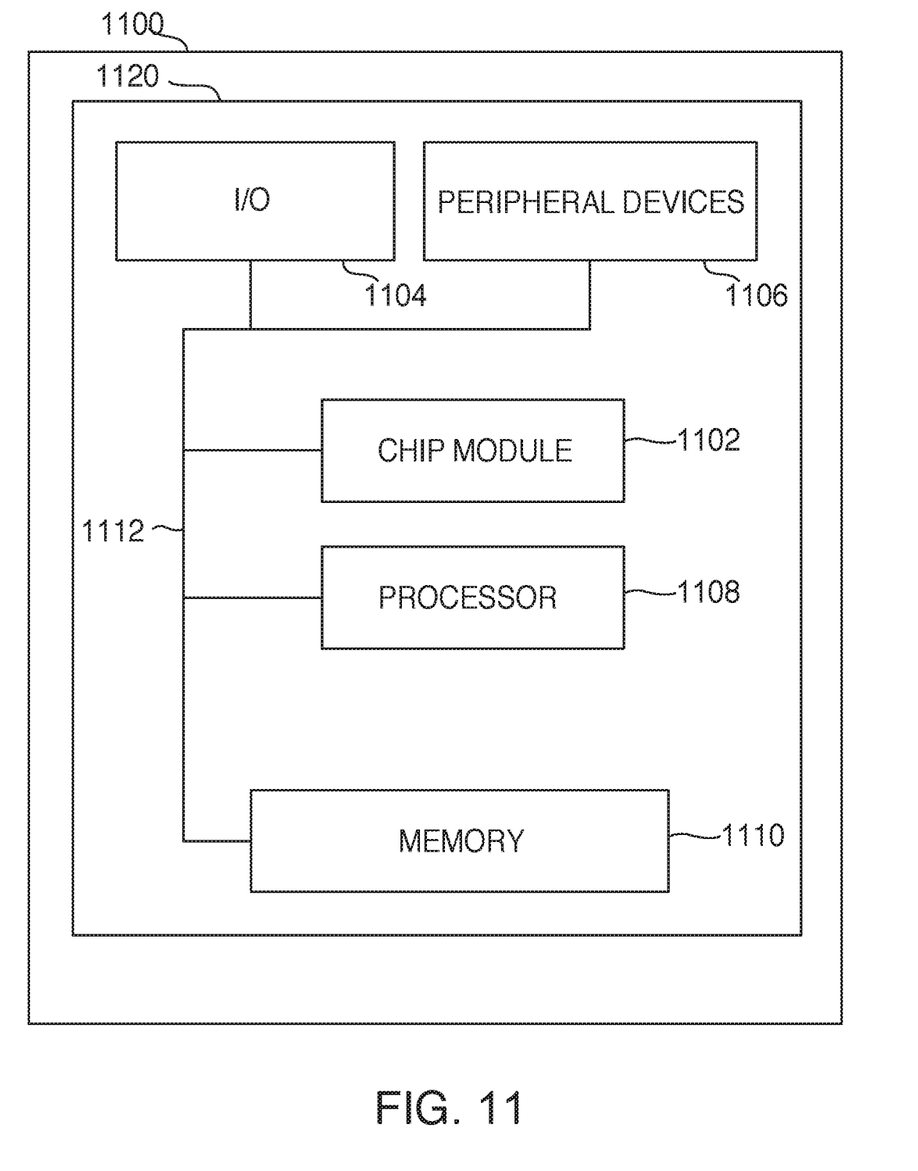
FIG. 11 shows another illustrative diagram in accordance with principles of the disclosure.

Systems and methods according to principles of the disclosure may include any suitable components and apparatus. FIGS. 10 and 11 may show some exemplary components and apparatus.

FIG. 10 shows an illustrative block diagram of system 1000 that includes computer 1001. Computer 1001 may alternatively be referred to herein as a "server" or a "computing device." Computer 1001 may be a desktop, laptop, tablet, smart-phone, smart-watch, or any other suitable computing device.

Computer 1001 may have a processor 1003 for controlling the operation of the device and its associated components, and may include RAM 1005, ROM 1007, input/output ("I/O") module 1009, and a memory 1015. The processor 1003 may also execute some or all software running on the computer—e.g. the operating system and/or voice recognition software. Other components commonly used for computers, such as EEPROM or Flash memory or any other suitable components, may also be part of the computer 1001.

The memory 1015 may be comprised of any suitable permanent storage technology—e.g., a hard drive. The memory 1015 stores software including the operating system 1017 any application(s) 1019 along with any data 1011 needed for the operation of the system 1000. Memory 1015 may also store videos, text, and/or audio files. The videos, text, and/or audio files may also be stored in cache memory, or any other suitable memory. Alternatively, some or all of computer executable instructions may be embodied in hardware or firmware (not shown). The computer 1001 may execute the instructions embodied by the software to perform various functions.

Input/output ("I/O") module may include connectivity to a microphone, keyboard, touch screen, mouse, and/or stylus through which a user of computer 1001 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 1000 may be connected to other systems via a local area network (LAN) interface 1013.

System 1000 may operate in a networked environment supporting connections to one or more remote computers, such as terminals 1041 and 1051. Terminals 1041 and 1051 may be personal computers or servers that include many or all of the elements described above relative to system 1000. The network connections depicted in FIG. 10 include a local area network (LAN) 1025 and a wide area network (WAN) 1029, but may also include other networks. When used in a LAN networking environment, computer 1001 is connected to LAN 1025 through a LAN interface or adapter 1013. When used in a WAN networking environment, computer 1001 may include a modem 1027 or other means for establishing communications over WAN 1029, such as Internet 1031.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server need not stream the data to the computer system. This may be beneficial for the computer system, because the retrieval may be faster than data-streaming. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 1019, which may be used by computer 1001, may include computer executable instructions for invoking user functionality related to communication, such as e-mail, Short Message Service (SMS), and voice input and speech recognition applications. Application program(s) 1019 (which may be alternatively referred to herein as "applications") may include computer executable instructions for searching, manipulating, and/or displaying graphs.

Computer 1001 and/or terminals 1041 and 1051 may also be devices including various other components, such as a battery, speaker, antennas (not shown).

Terminal 1051 and/or terminal 1041 may be portable devices such as a laptop, cell phone, Blackberry™, tablet, smartphone, or any other suitable device for receiving, storing, transmitting and/or displaying relevant information. Terminals 1051 and/or terminal 1041 may be other devices. These devices may be identical to system 1000 or different. The differences may be related to hardware components and/or software components.

Any information described above in connection with database 1011, and any other suitable information, may be stored in memory 1015. One or more of applications 1019 may include one or more algorithms that may be used to implement services relating to searching, manipulating, and/ or displaying graphs.

The systems and methods of the disclosure may be operational with numerous other general purpose or special purpose computing systems, environments, or configurations. Examples of well-known computing systems, environments, and/or configurations that may be suitable for use with the disclosure include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The systems and methods of the disclosure may be described in the general context of computer-executable instructions, such as program modules, being executed by a computer. Generally, program modules include routines, programs, objects, components, data structures, etc. that perform particular tasks or implement particular abstract data types. The systems and methods may also be practiced in distributed computing environments where tasks are performed by remote processing devices that are linked through a communications network. In a distributed computing environment, program modules may be located in both local and remote computer storage media including memory storage devices.

FIG. 11 shows illustrative apparatus 1100 that may be configured in accordance with the principles of the disclosure. Apparatus 1100 may be a computing machine. Apparatus 1100 may include one or more features of the apparatus shown in FIG. 10. Apparatus 1100 may include chip module 1102, which may include one or more integrated circuits, and which may include logic configured to perform any other suitable logical operations.

Apparatus 1100 may include one or more of the following components: I/O circuitry 1104, which may include a transmitter device and a receiver device and may interface with fiber optic cable, coaxial cable, telephone lines, wireless devices, PHY layer hardware, a keypad/display control device or any other suitable media or devices; peripheral devices 1106, which may include counter timers, real-time timers, power-on reset generators or any other suitable peripheral devices; logical processing device 1108, which may compute data structural information and structural parameters of the data; and machine-readable memory 1110.

Machine-readable memory 1110 may be configured to store in machine-readable data structures: machine executable instructions (which may be alternatively referred to herein as "computer code"), applications, signals, and/or any other suitable information or data structures.

Components 1102, 1104, 1106, 1108 and 1110 may be coupled together by a system bus or other interconnections 1112 and may be present on one or more circuit boards such as 1120. In some embodiments, the components may be integrated into a single chip. The chip may be silicon-based.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for multi-graph search and merge engines are provided. Persons skilled in the art will appreciate that the present invention can be practiced by other than the described embodiments, which are presented for purposes of illustration rather than of limitation, and that the present invention is limited only by the claims that follow.

What is claimed is:

1. A multi-graph search and merge platform, said platform comprising:
 a processor;
 a non-transitory memory;
 a set of one or more graphs stored in the memory, at least one graph from said set of graphs comprising two or more nodes interconnected by one or more edges; and
 a set of computer executable code stored in the memory, said computer executable code that, when run on the processor, is configured to:
  receive as input a search criterion via a user interface ("UP") module, said search criterion being a node profile or a subgraph profile arranged in a particular graphical arrangement;
  search the set of graphs for a subset of graphs that each includes a node or subgraph arranged in the particular graphical arrangement that matches the node profile or subgraph profile of the search criterion;
  merge all of the graphs from the subset of graphs into a merged graph, said merging comprising superimposing the subset of graphs on each other at the matching nodes or subgraphs while preserving the particular graphical arrangement, wherein the merged graph includes all the nodes and edges contained in the graphs from the subset of graphs; and display the merged graph via the UI module.

2. The platform of claim 1, wherein each graph from the set of graphs defines a beginning and an end, and wherein, when more than one node or subgraph in a particular graph matches the search criterion, the matching node or subgraph that is closest to the beginning of the particular graph is selected as the matching node or subgraph at which the particular graph is superimposed on the other graphs in the subset of graphs.

3. The platform of claim 1, wherein merging the subset of graphs further comprises coloring each graph of the subset of graphs a distinct color selected from a set of colors.

4. The platform of claim 1, wherein each node of each graph in the set of graphs comprises an event, said event that is defined by a predetermined set of properties.

5. The platform of claim 4, wherein each edge of each graph in the set of graphs connects a first node to a second node, and the connection defines a causational relationship between said first and second nodes, said relationship wherein the event of the first node causes the event of the second node.

6. The platform of claim 4, wherein each event defines a cybersecurity incident, and the platform is configured to analyze past cybersecurity incidents and to predict potential future cybersecurity incidents.

7. The platform of claim 1, wherein the set of graphs is stored in a hybrid database, said hybrid database comprising a graph database and a relational database.

8. A dynamic platform for multi-graph searching and merging, said platform comprising:
a processor;
a non-transitory memory;
a set of one or more graphs stored in the memory, at least one graph from said set of graphs comprising two or more nodes interconnected by one or more edges; and
a set of computer executable code stored in the memory, said computer executable code that, when run on the processor, is configured to:
receive as input a search criterion comprising a particular graphical arrangement via a user interface ("UI") module, said UI module that is configured to receive input and display output;
search the set of graphs for a subset of graphs that each satisfy the search criterion;
merge all of the graphs from the subset of graphs into a merged graph, wherein the merged graph preserves the particular graphical arrangement and includes all the nodes and edges contained in the graphs from the subset of graphs; and
display the merged graph as displayed output via the UI module.

9. The platform of claim 8, wherein the search criterion comprises a node profile, said node profile comprising a set of one or more node properties.

10. The platform of claim 9, wherein the subset of graphs comprises all of the graphs from the set of graphs that include at least one matching node, said matching node being a node that matches the node profile, and wherein merging the subset of graphs comprises:
selecting a matching node from a first graph in the subset of graphs as a locus node;
selecting a matching node from each of the remaining graphs as secondary nodes, said remaining graphs being all the graphs in the subset of graphs aside from the first graph; and
superimposing the remaining graphs onto the first graph by superimposing the secondary nodes onto the locus node to form a single merged graph.

11. The platform of claim 10, wherein each graph from the set of graphs defines a beginning and an end, and wherein the first matching node in the first graph is selected as the locus node and the first matching node in each of the remaining graphs are selected as the secondary nodes, the first matching node of a graph being a matching node that is closest to the beginning of said graph.

12. The platform of claim 8, wherein the search criterion comprises a subgraph profile, said subgraph profile comprising a set of nodes, each node from the set of nodes comprising a set of node properties, wherein the nodes from the set of nodes are connected in a particular arrangement via a set of edges.

13. The platform of claim 8, wherein merging the subset of graphs further comprises coloring each graph of the subset of graphs a distinct color selected from a set of colors.

14. The platform of claim 8, wherein:
each node of each graph in the set of graphs comprises an event, said event that is defined by a predetermined set of properties; and
each edge of each graph in the set of graphs connects a first node to a second node, and the connection defines a causational relationship between said first and second nodes, said relationship wherein the event of the first node causes the event of the second node.

15. The platform of claim 14, wherein each event defines a cybersecurity incident, and the platform is configured to analyze past cybersecurity incidents and to predict potential future cybersecurity incidents.

16. The platform of claim 8, further comprising a plurality of modes, wherein:
each node is associated with a plurality of values, and each value of the plurality of values corresponds to one mode of the plurality of modes;
the platform, when in a selected mode, is configured to display the values corresponding to the selected mode; and
the platform is configured to pivot from one mode to another.

17. The platform of claim 8, wherein the set of graphs is stored in a hybrid database, said hybrid database comprising a graph database and a relational database.

18. A method for amalgamating a plurality of graphs, said method comprising:
searching, via a processor, a set of graphs for all the graphs that satisfy a search criterion, said search criterion comprising a set of properties arranged in a particular graphical arrangement that is received as input;
forming a qualifying subset, said qualifying subset comprising the graphs that satisfy the search criterion;
amalgamating, via the processor, the graphs in the qualifying subset into a merged graph, wherein the merged graph preserves the particular graphical arrangement of the search criterion and includes all the nodes and edges contained in the graphs from the qualifying subset; and
displaying the merged graph on a display.

19. The method of claim 18, wherein the set of properties of the search criterion define either a node profile or a subgraph profile, and wherein a graph that satisfies the search criterion comprises a unifying node or a unifying subgraph, said unifying node or unifying subgraph that matches the search criterion, and wherein the amalgamating comprises superimposing the subset of graphs on each other at the unifying nodes or unifying subgraphs.

20. The method of claim 19, wherein, when more than one node or subgraph in a particular graph matches the search criterion, the matching node or subgraph that is closest to the beginning of the particular graph is selected as the unifying node or subgraph.

* * * * *